(12) United States Patent
Maddukuri

(10) Patent No.: US 10,984,150 B2
(45) Date of Patent: Apr. 20, 2021

(54) HARNESS DESIGN CHANGE RECORD AND REPLAY

(71) Applicant: Mentor Graphics Corporation, Wilsonville, OR (US)

(72) Inventor: Vikas Maddukuri, Altrincham (GB)

(73) Assignee: Siemens Industry Software Inc., Plano, TX (US)

( * ) Notice: Subject to any disclaimer, the term of this patent is extended or adjusted under 35 U.S.C. 154(b) by 1111 days.

(21) Appl. No.: 14/609,880

(22) Filed: Jan. 30, 2015

(65) Prior Publication Data

US 2016/0224691 A1   Aug. 4, 2016

(51) Int. Cl.
*G06F 30/18*   (2020.01)
*G06F 8/71*    (2018.01)
*G06F 113/16*  (2020.01)

(52) U.S. Cl.
CPC ................ *G06F 30/18* (2020.01); *G06F 8/71* (2013.01); *G06F 2113/16* (2020.01)

(58) Field of Classification Search
CPC ...... G06F 2217/36; G06F 8/71; G06F 17/509; G06F 30/18; G06F 2113/16
See application file for complete search history.

(56) References Cited

U.S. PATENT DOCUMENTS 7,107,197 B1 *  9/2006  Shropshire .............. G06F 30/18
                                              703/13
8,065,126 B2 * 11/2011  Dong ................... G06F 17/5095
                                              703/7
9,836,043 B2 * 12/2017  Yvon ................ G05B 19/41865
2003/0079197 A1 *  4/2003  Pannala ................. G06F 30/18
                                              716/102
2004/0230560 A1 * 11/2004  Elza .................... G06F 40/166
2007/0006130 A1 *  1/2007  Stamler .................. G06F 8/71
                                              717/104

(Continued)

OTHER PUBLICATIONS

"Difference." Merriam-Webster.com. [retrieved on Aug. 4, 2018]. Retrieved from <https://www.merriam-webster.com/dictionary/difference> (Year: 2018).*

(Continued)

*Primary Examiner* — Rehana Perveen
*Assistant Examiner* — Alfred H B Wechselberger

(57) ABSTRACT

This application discloses a system implementing tools and mechanisms to identify alterations made to a baseline harness design that describes a wire harness, and selectively modify a target harness design based, at least in part, on the alterations made to the baseline harness design. The tools and mechanisms can perform the selective modification of the target harness design through a three-way comparison of the baseline harness design, an altered version of the baseline harness design, and the target harness design. During the three-way comparison, the tools and mechanisms can compare the target harness design to the baseline harness design, and compare the altered version of the baseline harness design to the baseline harness design. The tools and mechanisms can then selectively modify the target harness design based on the alterations made to the baseline harness design and the differences between the target harness design to the baseline harness design.

14 Claims, 6 Drawing Sheets

(56) References Cited

U.S. PATENT DOCUMENTS

| | | | | |
|---|---|---|---|---|
| 2007/0141899 | A1* | 6/2007 | Saini | G06F 17/509 439/502 |
| 2008/0301613 | A1* | 12/2008 | Holdsworth | G06F 17/5095 716/119 |
| 2010/0235157 | A1* | 9/2010 | Vedula | G06F 17/5009 703/13 |
| 2013/0226531 | A1* | 8/2013 | Holdsworth | G06F 17/5095 703/1 |
| 2014/0100824 | A1* | 4/2014 | Bess | G06F 17/5095 703/1 |
| 2014/0281872 | A1* | 9/2014 | Glover | G06F 40/194 715/229 |
| 2015/0149459 | A1* | 5/2015 | Hughes | G06F 16/24573 707/736 |

OTHER PUBLICATIONS

"Technological." Merriam-Webster.com. [retrieved on Aug. 4, 2018]. Retrieved from <https://www.merriam-webster.com/dictionary/technological> (Year: 2018).*

"Technology." Merriam-Webster.com. [retrieved on Aug. 4, 2018]. Retrieved from <https://www.merriam-webster.com/dictionary/technology> (Year: 2018).*

"Topology." [online] Oxford English Dictionary [retrieved on Aug. 4, 2018]. Retrieved from <http://www.oed.com/view/Entry/203426> (Year: 2018).*

"Use of 'to include' vs 'including'". [discussion forum] A Way with Words [retrieved on Jul. 25, 2018]. Retrieved from <https://www.waywordradio.org/discussion/topics/use-of-to-include-vs-including-1/> (Year: 2009).*

Reza Danesh et al. "An Agent-Based Decision Network for Concurrent Engineering Design" Concurrent Engineering: Research and Apps, vol. 0, No. 1, pp. 37-47; doi: 10.1106/P3P6-3HEA-GXB2-9MTT [retrieved on May 18, 2019]. Retrieved from <https://journals.sagepub.com/doi/abs/10.1177/1063293X0100900104> (Year: 2001).*

Siemens Product Lifecycle Management Software Inc. "Teamcenter 10.1: Wiring Harness Design Tools Integration Guide" Pub Num PLM00088 I, pp. 1-9 to 1-11 [retrieved on May 19, 2019]. Retrieved from <http://help.aviacons.ru/tc10doc/PDF/en_US/tdocExt/pdf/wiring_harness_design_tools_integration.pdf> (Year: 2013).*

Hu et al. "A Concurrent Locking Protocol for Two-Dimensional Cooperative Workspace" Journal of Computer-Aided Design and Computer Graphics, DOI: 10.1016/S1005-8885(07)60042-9 [retrieved on Jan. 3, 2019]. Retrieved from <http://en.cnki.com.cn/Article_en/CJFDTOTAL-JSJF200602010.htm> (Year: 2006).*

Park et al. "Computational Support for Concurrent Engineering of Cable Harnesses" Computers in Engineering Conference, San Francisco, CA; CDR Technical Report No. 19920219 [retrieved on Jan. 3, 2019]. Retrieved from <https://pdfs.semanticscholar.org/d543/11b99f7c2360df6758fd077470b26cd48701.pdf> (Year: 1992).*

Gerlicher, A. "A Framework for Real-Time Collaborative Engineering in the Automotive Industries" Y. Luo (Ed.): CDVE 2006, LNCS 4101, pp. 164-173 [retrieved on Jan. 3, 2019]. Retrieved from <https://link.springer.com/content/pdf/10.1007%2F11863649_21.pdf> (Year: 2008).*

\* cited by examiner

HARNESS DESIGN CHANGE RECORD AND REPLAY

TECHNICAL FIELD

This application is generally related to electronic design automation and, more specifically, to selective application of changes to a harness design.

BACKGROUND

Wire harness development often includes generating a harness design that describes a wire harness to be manufactured. Typically, a harness design is generated through an incremental revision process, for example, a designer can generate an electronic copy of the harness design, perform any alterations or modifications to the copy, and, usually after receiving administrative approval, merge the altered copy with a baseline version of the harness design that was utilized to generate the copy. This iterative process can continue until the harness design describes the wire harness to be manufactured.

Since these harness designs are typically developed with design teams, there can be overlap in the incremental revision process, which can sometimes lead to versioning conflicts. For example, when multiple designers perform alterations or modifications to copies of the harness design in parallel, the merge process often will merge at least one of the altered copies with a different version of the harness design than was utilized to generate that copy. This versioning conflict forces one or more of the changes, either to the copy or an intervening change to the harness design, to be overwritten during the merge. For example, when a tool implementing the merge functionality considers the altered copy a master, any intervening changes to the baseline version of the harness design will be undone during the merge process. Conversely, if the tool implementing the merge functionality considers the harness design the master, one or more of the changes in the alter copy may not update the harness design. The best case is that the previously performed design work will typically need to be re-done and re-merged with the updated harness design, while the worst case results in failing to appreciate the merge process inadvertently removed intervening changes or did not update the harness design as expected.

SUMMARY

This application discloses a system implementing tools and mechanisms to identify alterations made to a baseline harness design that describes a wire harness, and selectively modify a target harness design based, at least in part, on the alterations made to the baseline harness design. The tools and mechanisms can perform the selective modification of the target harness design through a three-way comparison of the baseline harness design, an altered version of the baseline harness design, and the target harness design. During the three-way comparison, the tools and mechanisms can compare the target harness design to the baseline harness design, and compare the altered version of the baseline harness design to the baseline harness design. The tools and mechanisms can then selectively modify the target harness design based on the alterations made to the baseline harness design and the differences between the target harness design to the baseline harness design.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
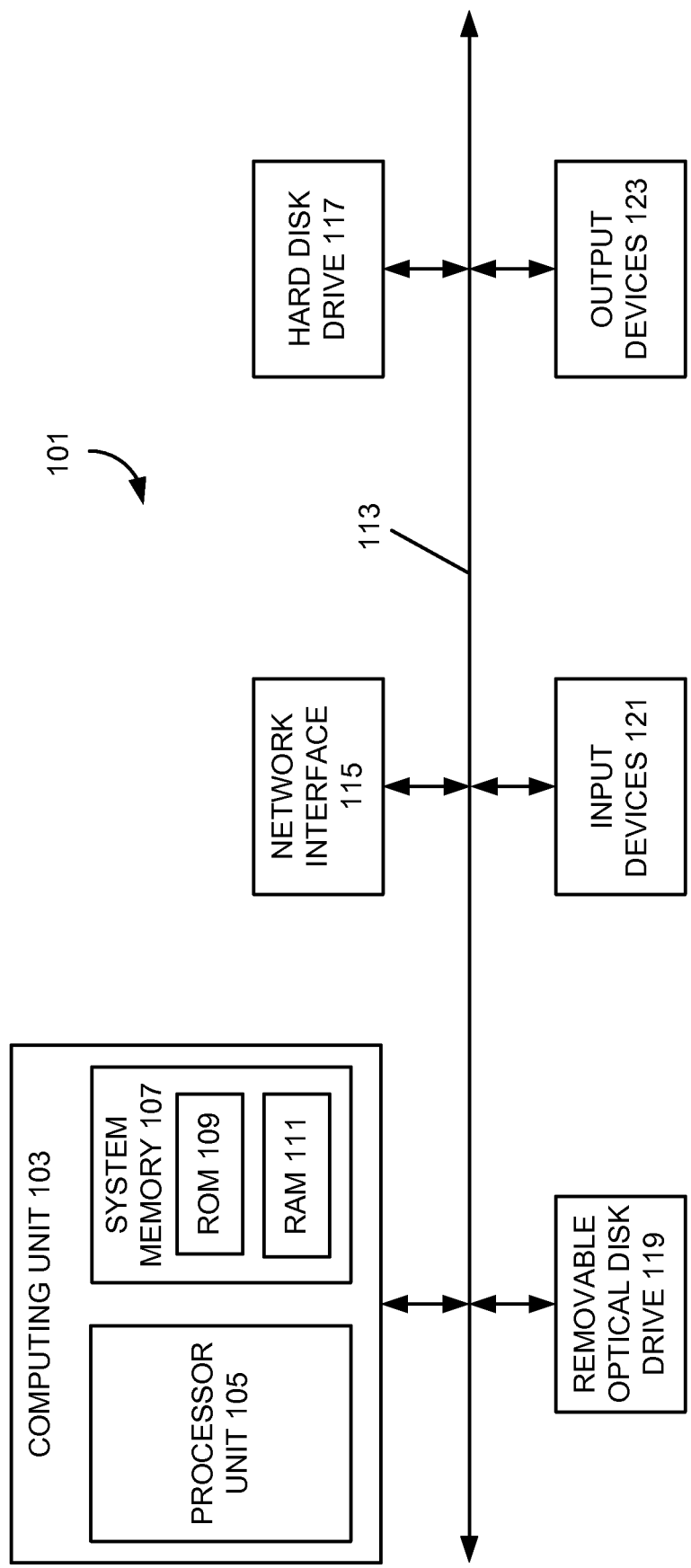
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
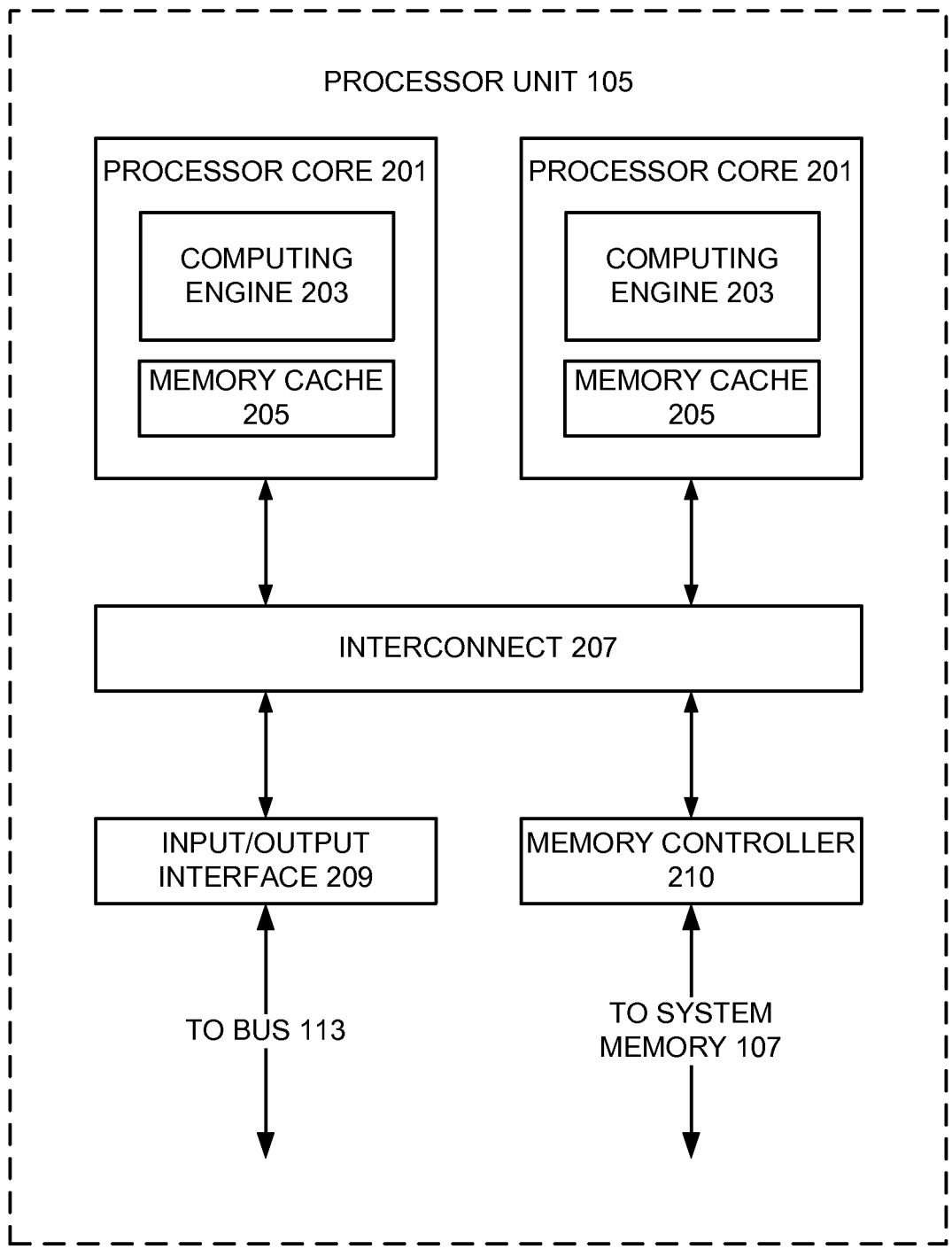

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Illustrative Harness Design Development Tool

Figure 3:
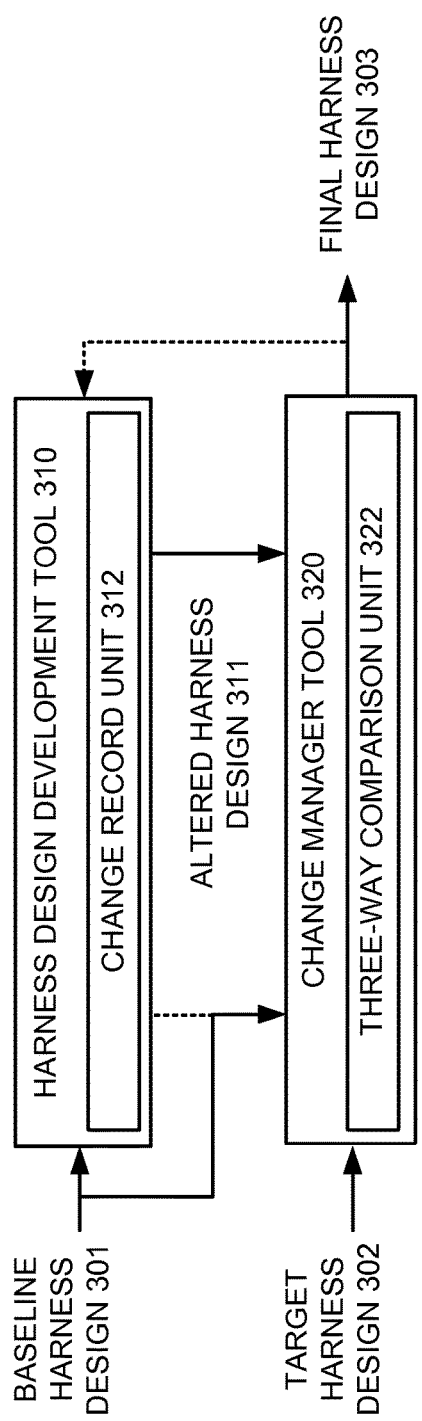
FIG. 3 illustrates an example harness design development tool and a change manager tool according to various embodiments of the invention.

FIG. 3 illustrates an example harness design development tool 310 and a change manager tool 320 according to various embodiments of the invention. Referring to FIG. 3, the harness design development tool 310 can receive a baseline harness design 301 that describes at least a portion of a wire harness. In some embodiments, the harness design development tool 310 can internally generate the baseline harness design 301, for example, based on received user input.

The harness design development tool 310 can modify the baseline harness design 301, for example, in response to user input, to generate an altered harness design 311. The modification of the baseline harness design 301 can include alteration of objects or wire harness components in the baseline harness design 301, which can include change of an object characteristic, change in location or topology of the wire harness component in the baseline harness design 301, a change in an external reference to other objects or components, or the like. The modification of the baseline harness design 301 also can include addition or removal of an object or wire harness component in the baseline harness design 301. Examples of wire harness design alterations will be described below with reference to FIGS. 6A-6D.

The harness design development tool 310 can include a change record unit 312 to record the baseline harness design 301, for example, by capturing a snapshot of a configuration of the baseline harness design 301. The change record unit 312 also can record the altered harness design 311, for example, by capturing a snapshot of a configuration of the altered harness design 311. In some embodiments, the change record unit 312 can receive user input (not shown) requesting initiation of a change record operation, which can record a current state of a harness design in the harness design development tool 310 as the baseline harness design 301 and, once the modification of the harness design is complete, record a state of the harness design as the altered harness design 311.

The harness design development tool 310 can pass the baseline harness design 301 and the altered harness design 311 to the change manager tool 320. In some embodiments, the harness design development tool 310 can determine the differences between the baseline harness design 301 and the altered harness design 311, i.e., which changes were made to the baseline harness design 301, and output those differences to the change manager tool 320 instead of or in addition to the baseline harness design 301 and the altered harness design 311.

The change manager tool 320 can include a three-way comparison unit 322 to selectively modify the target harness design 302 based on the alterations made to the baseline harness design 301 as represented in the altered harness design 311, which generates a final harness design 303. In some embodiments, the target harness design 302 can be a different version of the baseline harness design 301, for example, a version that was modified in-between the recording of the baseline harness design 301 and recording of the altered harness design 311. In other embodiments, the target harness design 302 can be a different harness design than the baseline harness design 301, which, in some examples, can be developed independently from the baseline harness design 301 and/or stored in a different database or memory system.

The three-way comparison unit 322 can perform the selective modification of the target harness design 302 by comparing the baseline harness design 301 with the altered harness design 311 to identify the alterations made to the baseline harness design 301 and by comparing the baseline harness design 301 with the target harness design 302 to determine which portions of the target harness design 302, if any, to modify based on the alterations made to the baseline harness design 301. In some embodiments, the three-way comparison unit 322 can modify portions of the target harness design 302 when those portions are the same as corresponding portions in the baseline harness design 301 and different than corresponding portions in the altered harness design 311. In other words, rather than modifying the entire target harness design to match the altered baseline design 311, the three-way comparison unit 322 can implement granular change, which can allow for design teams to divide their harness development into sub-system designs without risk of overwriting other intervening developer changes when their sub-system is included into the harness design.

In some examples, the three-way comparison unit 322 can perform the selective modification of the target harness design 302 on an object-by-object basis or object aspect or characteristic basis. The three-way comparison unit 322 can identify different objects, such as wire harness components, in the baseline harness design 301, the altered harness design 311, and the target harness design 302. In some embodiments, the three-way comparison unit 322 also can categorize characteristics of the identified object, for example, based on how the three-way comparison unit 322 determines or performs the selective modification of the target harness design 302. For example, the three-way comparison unit 322 can categorize the object characteristics into an attribute category, a child category, and an external category. The attribute category can include characteristics that describe properties of the wire harness components. The child category can include characteristics that describe relationships of corresponding objects to other objects in a harness design. For example, when a connector includes multiple pins, the object for the connector can have a characteristic that relates the connector to the multiple pins. In some embodiments, the child object cannot exist without a corresponding parent object. The external category can include characteristics that describe relationships of corresponding objects to other objects, such as an insulation referring to a corresponding wire bundle. In some embodiments, the external objects can exist independently from each other when not linked or related.

The three-way comparison unit 322 can utilize the identified objects to compare the baseline harness design 301 with both the altered harness design 311 and the target harness design 302. In some embodiments, the three-way comparison unit 322 can map the baseline harness design 301 to both the altered harness design 311 and the target harness design 302 on an object-by-object basis, for example, based on the categorization of object characteristics and/or topology matching between the harness designs 301, 302, and 311. Once mapped, the three-way comparison unit 322 can compare objects in the baseline harness design 301 with mapped objects in both the altered harness design 311 and the target harness design 302.

Based on the comparison, the three-way comparison unit 322 can determine whether to modify one or more objects in the target harness design 302. In some embodiments, the determination by the three-way comparison unit 322 can be made differently for different object characteristics. For example, when an object characteristic has been categorized in an attribute category or an external category, the three-way comparison unit 322 can determine to modify an object in the target harness design 302 having an object characteristic that is the same in a correspondingly mapped object in the baseline harness design 301, but different in a correspondingly mapped object in the altered harness design 311. In other examples, when an object characteristic has been categorized in a child category, the three-way comparison unit 322 can determine to modify child relationships for an object in the target harness design 302 as they were altered for a correspondingly mapped object in the altered harness design 311. An example of the determination made by the three-way comparison unit 322 when dealing with child relationship characteristics for an object is shown in Table 1:

TABLE 1

| | Baseline Harness Design | Altered Harness Design | Target Harness Design | Final Harness Design |
| --- | --- | --- | --- | --- |
| Object Characteristics | Parent Child 1 Child 2 Child 5 | Parent Child 1 Child 3 | Parent Child 1 Child 2 Child 4 | Parent Child 1 Child 3 Child 4 |

In Table 1, a baseline harness design includes a parent object related to three child objects, Child 1, Child 2, and Child 5. The altered harness design includes a parent object (mapped to the parent object of the baseline harness design) that is related to two child objects, Child 1 and Child 3, i.e., the baseline harness design was modified to remove relationships to two child objects, Child 2 and Child 5, and add a relationship to one child object, Child 3. The target harness design includes a parent object (mapped to the parent object of the baseline harness design) that is related to three child objects, Child 1, Child 2, and Child 4. During a compare with the three-way comparison unit 322, the target harness design can be modified similarly to how the baseline harness design was altered in generating the altered harness design, remove a relationship to child object, Child 2, and add a relationship to child object, Child 3. Since the target harness design had already removed the relationship to child object, Child 5, the three-way comparison unit 322 did not need to further modify the target harness design to synchronize it with the altered harness design. Also during the compare with the three-way comparison unit 322, relationships to child objects, Child 1 and Child 4 can be preserved.

The three-way comparison unit 322 can output the final harness design 303, which is a modified version of the target harness design 302. In some embodiments, the final harness design 303 can be fed back to the harness design development tool 310 to be a new baseline harness design for a subsequent harness design iteration.

Figure 4:
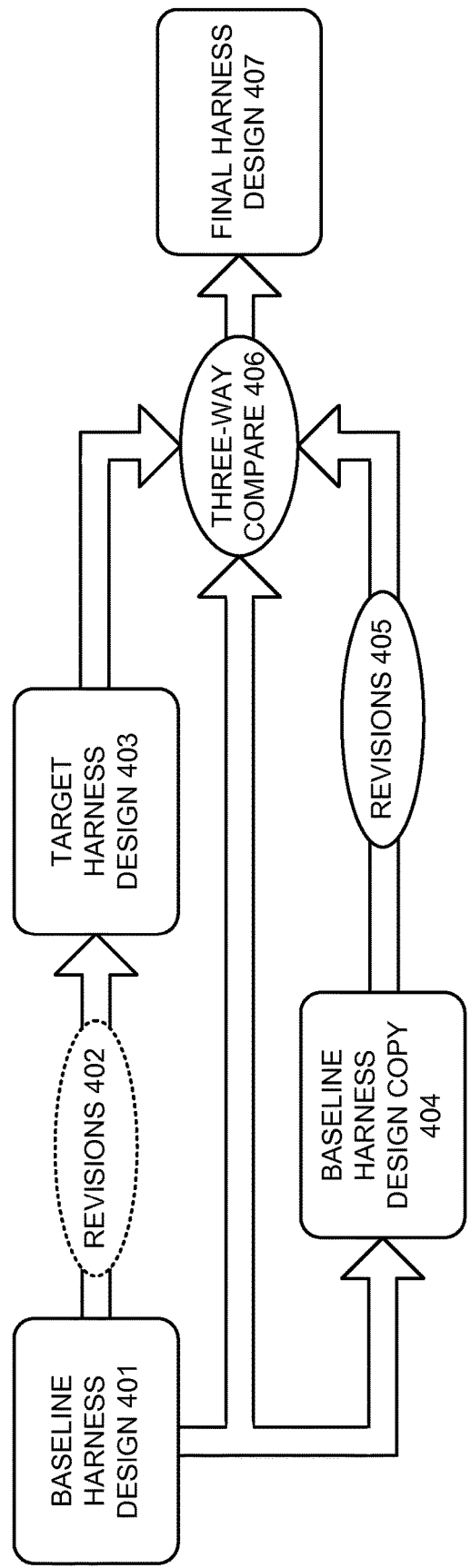
FIG. 4 illustrates a diagram showing an example development flow for a harness design according to various embodiments of the invention.

FIG. 4 illustrates a diagram showing an example development flow for a harness design according to various embodiments of the invention. Referring to FIG. 4, the developmental flow shows a parallel design revision implementation, which allows a baseline harness design 401 to be independently revised, for example, via revisions 402 and 405, and have the those different versions of the baseline harness design 401 merged in a three-way compare 406 to generate a final harness design 407.

To begin a revision process, a copy of the baseline harness design 401 can be generated, for example, in response to a designer initiating a change record operation. The baseline harness design copy 404 can be revised, for example, based on user input. In some embodiments, the revised version of the baseline harness design copy 404 can be reviewed and approved for inclusion back into the baseline harness design 401.

The baseline harness design 401 can be revised in parallel with the revisions 405, for example, via optional revisions 402 that occur before approval of the revisions 405. The revisions 402 can generate a target harness design 403, which can be merged with the revised version of the baseline harness design copy 404 and not with the baseline harness design 401. The three-way compare 406 can receive the target harness design 403, the baseline harness design 401 and the revised version of the baseline harness design copy 404, and selectively modify the target harness design 403 to include the revisions 405 made to the baseline harness design copy 404. Thus, development and changes to a baseline harness design 401 can be made concurrently, and the three-way compare 406 can merge the concurrent changes to generate the final harness design 407.

Figure 5:
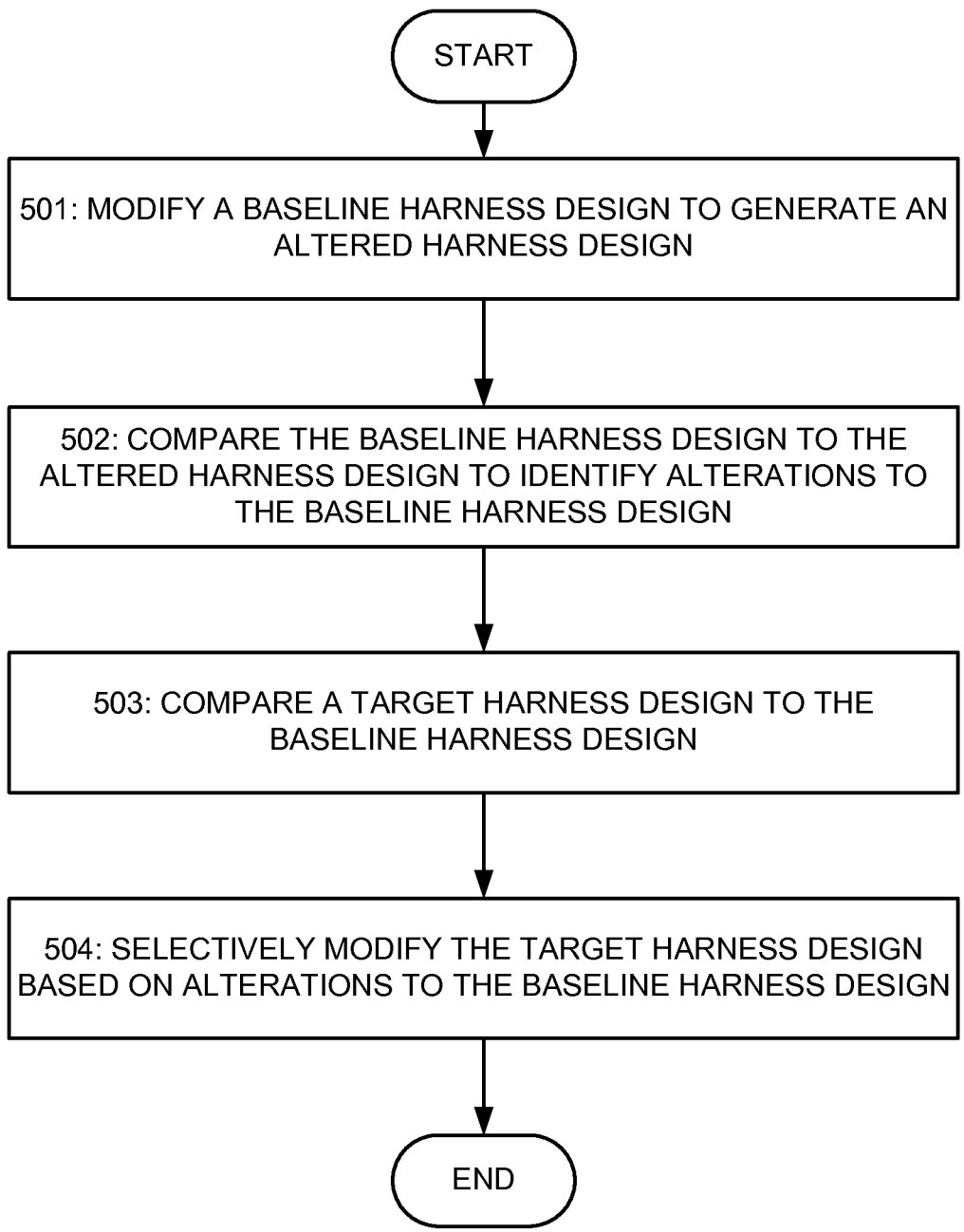
FIG. 5 illustrates a flowchart showing an example implementation of a three-way comparison according to various embodiments of the invention.

FIG. 5 illustrates a flowchart showing an example implementation of a three-way comparison according to various embodiments of the invention. Referring to FIG. 5, in a block 501, a harness development system can modify a baseline harness design to generate an altered harness design. The harness development system can modify the baseline harness design, for example, in response to user input, to generate an altered harness design. The modification of the baseline harness design can include alteration of objects or wire harness components in the baseline harness design, which can include change of an object characteristic or relationship to other objects, change in location or topology of the wire harness component in the baseline harness design, or the like. In some embodiments, the location of a component in a harness design can be described a child aspect or characteristic, i.e., the location, for a parent object, i.e., the component. The modification of the baseline harness design also can include addition or removal of an object or wire harness component in the baseline harness design.

The harness development system can record the baseline harness design, for example, by capturing a snapshot of a configuration of the baseline harness design. The harness development system also can record the altered harness design, for example, by capturing a snapshot of a configuration of the altered harness design. In some embodiments, the harness development system can receive user input (not shown) requesting initiation of a change record operation, which can record a current state of a harness design in the harness design development tool as the baseline harness design and, once the modification of the harness design is complete, record a state of the harness design as the altered harness design.

In a block 502, the harness development system can compare the baseline harness design to the altered harness design to identify alterations to the baseline harness design. The harness development system can identify different objects, such as wire harness components, in the baseline harness design and the altered harness design. In some embodiments, the harness development system also can categorize characteristics of the identified object, for example, into an attribute category, a child category, and an external category. The harness development system can utilize the identified objects and categorized characteristics to compare the baseline harness design with the altered harness design. In some embodiments, the harness development system can map the baseline harness design to the altered harness design on an object-by-object or characteristic-by-characteristic basis, for example, based on the categorization of object characteristics and/or topology matching between the two harness designs. Once mapped, the harness development system can compare objects and characteristics in the baseline harness design with mapped objects in both the altered harness design.

In some embodiments, the harness development system can map the baseline harness design to the altered harness design through various techniques. For example, the harness development system can perform shape recognition or topology matching on the baseline harness design and the altered harness design, and align objects and characteristics between the two harness designs based on the results of the shape recognition or topology matching. The harness development system also can match sets of attributes in the baseline harness design to sets of attributes in the altered harness design, and align objects and characteristics between the two harness designs based on the results of the attribute matching.

In a block 503, the harness development system can compare a target harness design to the baseline harness design. The harness development system can identify different objects, such as wire harness components, in the baseline harness design and the target harness design. In some embodiments, the harness development system also can categorize characteristics of the identified object, for example, into an attribute category, a child category, and an external category. The harness development system can utilize the identified objects and categorized characteristics to compare the baseline harness design with the target harness design. In some embodiments, the harness development system can map the baseline harness design to the target harness design on an object-by-object basis, for example, based on the categorization of object characteristics and/or topology matching between the two harness designs. Once mapped, the three harness development system can compare objects in the baseline harness design with mapped objects in both the target harness design.

In a block 504, the harness development system can selectively modify the target harness design based on alterations to the baseline harness design. In some embodiments, the determination of which portions of the target harness design to alter by the harness development system can be made differently for different object characteristics. For example, when an object characteristic has been categorized in an attribute category or an external category, the harness development system can determine to modify an object in the target harness design having an object characteristic that is the same in a correspondingly mapped object in the baseline harness design, but different in a correspondingly mapped object in the altered harness design. In other examples, when an object characteristic has been categorized in a child category, the harness development system can determine to modify child relationships for an object in the target harness design as they were altered for a correspondingly mapped object in the altered harness design, while preserving any target-only changes.

The blocks in FIG. 5 can be repeated for additional changes to be made to the modified target harness design. Since the harness development system performs its harness change and record operations granularly, the multiple iterations through the blocks in FIG. 5 can be order independent, allowing changes to different aspects or characteristics of a harness design at different times to result in the same final harness design. Also, in some embodiments, the harness development system can undo or negate the selectively modification of the the target harness design by selectively altering the modified target design with the original version of the baseline harness design.

Figure 6A:
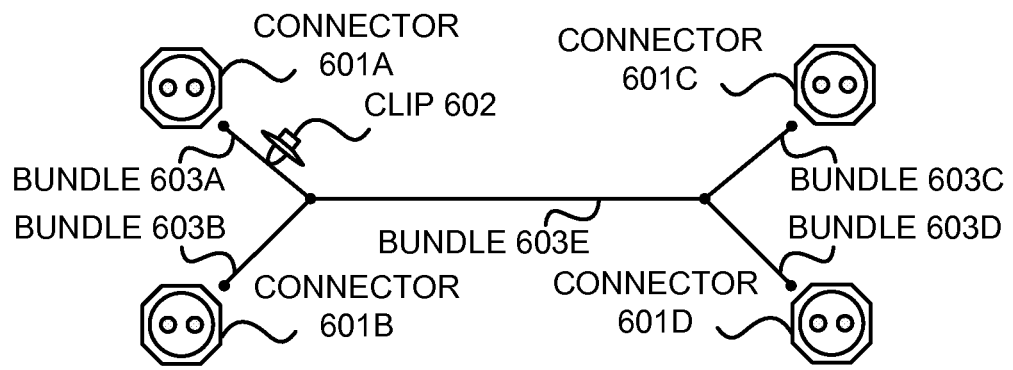
FIGS. 6A-6D illustrate example harness designs associated with a three-way comparison according to various embodiments of the invention.

FIGS. 6A-6D illustrate example harness designs associated with a three-way comparison according to various embodiments of the invention. Referring to FIG. 6A, an example baseline harness design can include multiple connectors 601A-601D coupled to respective wire bundles 603A-603D. The wire bundles 603A-603D can couple to another wire bundle 603E—with wire bundles 603A-603B couple to one end of the wire bundle 603E and with wire bundles 603C-603D coupled to the other end of the wire bundle 603E. The wire bundle 603A also can couple to a mechanical clip 602. The location of the mechanical clip 602 in the baseline harness design can be a child aspect for the mechanical clip 602 and an external aspect for the wire bundle 603A coupled to the mechanical clip 602.

Figure 6B:
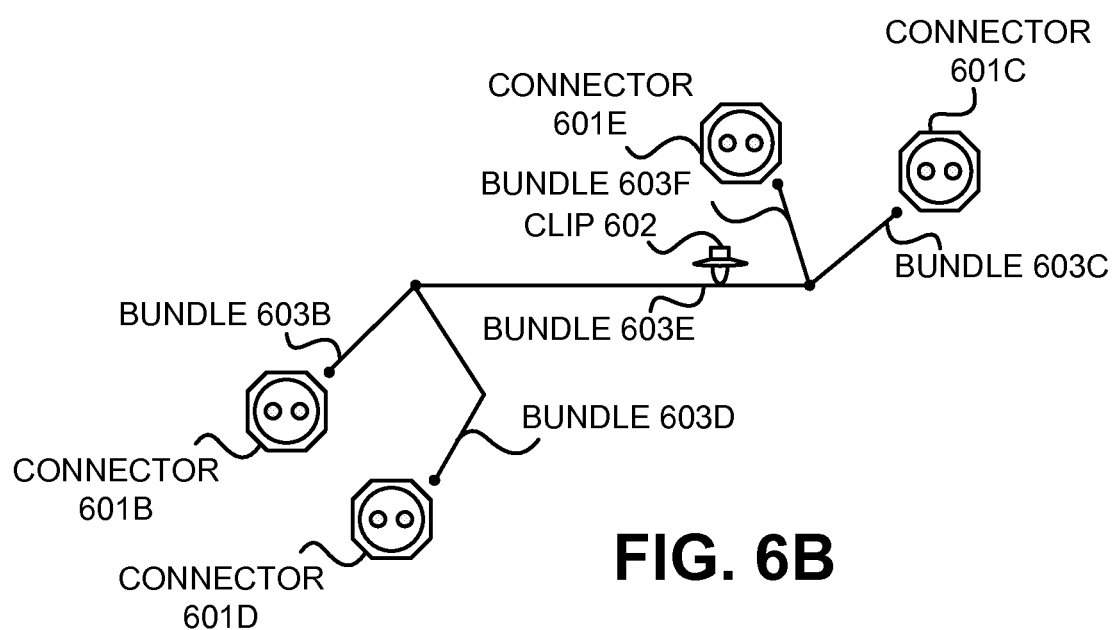

Referring to FIG. 6B, the baseline harness design in FIG. 6A can be modified into an altered harness design. The altered harness design can be similar to the baseline harness design with the following changes. The wire bundle 603D and corresponding connector 601D can be moved to couple to the opposite side of the wire bundle 603E. A new connector 601E and corresponding wire bundle 601F can be added—with the wire bundle 603F coupled to the same end of the wire bundle 603E as wire bundle 603C. The mechanical clip 602 can be moved from being coupled to the wire bundle 603A to a right-side of the wire bundle 603E, which can alter the child aspect for the mechanical clip 602, add an external aspect for the wire bundle 603F coupled to the mechanical clip 602, and remove the external aspect for the wire bundle 603A no longer coupled to the mechanical clip 602. The wire bundle 603A and corresponding connector 601A can be removed. Although not shown in FIG. 6B, the altered harness design can alter an attribute of the wire bundles, such as modifying the wire color from blue to green.

Figure 6C:
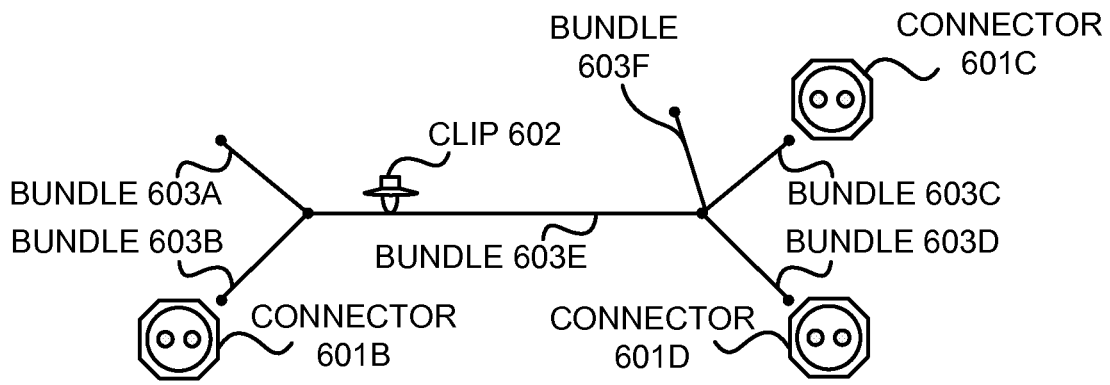

Referring to FIG. 6C, a target harness design can be similar to the baseline harness design in FIG. 6A with the mechanical clip 602 moved from being coupled to the wire bundle 603A to a left-side of the wire bundle 603E, the connector 601A being removed, and a new wire bundle 601F coupled to the same end of the wire bundle 603E as wire bundles 603C and 603D. In some embodiments, the target harness design can be a modified version of the baseline harness design, or a different harness design than the baseline harness design. Although not shown in FIG. 6C, the target harness design can have a different a wire diameter attribute for the wire bundles than the baseline harness design, namely the wire diameter can be 1.5 mm in the baseline harness design and 2.0 mm in the target harness design.

Figure 6D:
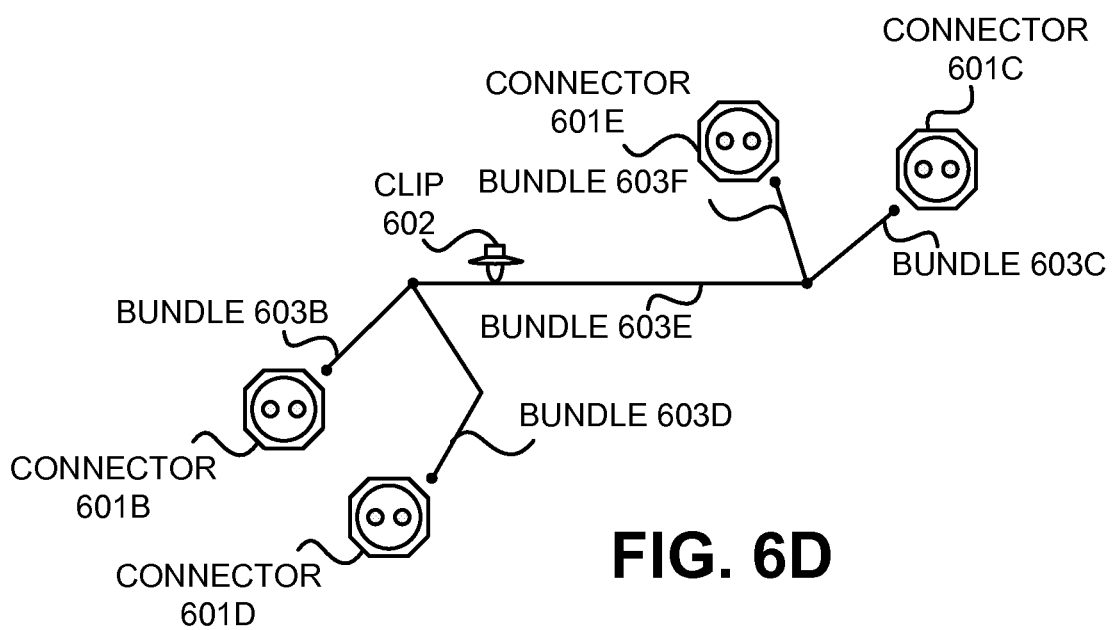

Referring to FIG. 6D, the target harness design in FIG. 6C can be modified into a final harness design based on the alterations made to the baseline harness design in FIG. 6A as shown in the altered harness design in FIG. 6B. The final harness design can be similar to the target harness design with the following changes. The wire bundle 603D and corresponding connector 601D can be moved to couple to the opposite side of the wire bundle 603E. A new connector 601E can be added to the wire bundle 603F and wire bundle 603A can be deleted. Since the location of the mechanical clip 602 changed between the baseline harness design and the target harness design, the location of the mechanical clip 602 in the final harness design can be the same as in the target harness design, i.e., coupled to the wire bundle 603A to a left-side of the wire bundle 603E. Although not shown in FIG. 6D, the final harness design can have wire bundles that have a green wire color from the altered harness design and a wire diameter that is 2.0 mm from the target harness design.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Conclusion

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   comparing, by a computing system, a baseline harness design describing a wire harness to a first revised version of the baseline harness design, which identifies alterations made to one or more object characteristics in the baseline harness design, wherein the object characteristics describe relationships between objects in the baseline harness design;
   comparing, by the computing system, the baseline harness design to a second revised version of the baseline harness design, which identifies one or more differences between the object characteristics in the second revised version of the baseline harness design and the object characteristics in the baseline harness design;
   merging, by the computing system, the first revised version of the baseline harness design with the second revised version of the baseline harness design to generate a final harness design by modifying one or more of the relationships described by the object characteristics in the second revised version of the baseline harness design to include one or more of the alterations to the object characteristics in made to the baseline harness design in the first revised version of the baseline harness design based on the differences between the object characteristics in the second revised version of the baseline harness design and the object characteristics in the baseline harness design; and
   recording, by the computing system into a memory device, the final harness design, which corresponds to the modification to the second revised version of the baseline harness design with the one or more of the alterations made to the baseline harness design in the first revised version of the baseline harness design, wherein the wire harness is manufactured based on the final harness design.

2. The method of claim 1, wherein modifying the relationships described by the object characteristics in the second revised version of the baseline harness design further comprises:
   comparing the objects in the baseline harness design to corresponding objects in the second revised version of the baseline harness design and to corresponding objects in the first revised version of the baseline harness design; and
   modifying one or more objects in the second revised version of the baseline harness design to match the corresponding objects in the first revised version of the baseline harness design when the one or more objects, characteristics, or relationships in the second revised version of the baseline harness design are the same as the corresponding objects, characteristics, or relationships in the baseline harness design and different than the corresponding objects, characteristics, or relationships in the first revised version of the baseline harness design.

3. The method of claim 2, wherein comparing the objects in the baseline harness design, the second revised version of the baseline harness design, and the first revised version of the baseline harness design further comprises comparing at least one of attributes of the objects or relationships to other objects.

4. The method of claim 1, further comprises:
   comparing, by the computing system, a topology in the baseline harness design to corresponding topology in the second revised version of the baseline harness design and to corresponding topology in the first revised version of the baseline harness design; and
   modifying, by the computing system, at least a portion of the topology in the second revised version of the baseline harness design to match the corresponding topology in the first revised version of the baseline harness design when the at least the portion of the topology in the second revised version of the baseline harness design is the same as the corresponding topology in the baseline harness design and different than the corresponding topology in the first revised version of the baseline harness design.

5. The method of claim 1 further comprising modifying, by the computing system, the baseline harness design to generate the first revised version of the baseline harness design.

6. A system comprising:
   a memory system configured to store computer-executable instructions; and
   a computing system, in response to execution of the computer-executable instructions, is configured to:
      compare a baseline harness design describing a wire harness to a first revised version of the baseline harness design, which identifies alterations made to one or more object characteristics in the baseline harness design, wherein the object characteristics describe relationships between objects in the baseline harness design;
      compare the baseline harness design to a second revised version of the baseline harness design, which identifies one or more differences between the object characteristics in the second revised version of the baseline harness design and the object characteristics in the baseline harness design;

merge the first revised version of the baseline harness design with the second revised version of the baseline harness design to generate a final harness design by modifying one or more of the relationships described by the object characteristics in the second revised version of the baseline harness design to include one or more of the alterations to the object characteristics in made to the baseline harness design in the first revised version of the baseline harness design based on the differences between the object characteristics in the second revised version of the baseline harness design and the object characteristics in the baseline harness design; and record the final harness design, which corresponds to the modification to the second revised version of the baseline harness design having one or more of the alterations made to the baseline harness design in the first revised version of the baseline harness design, wherein the wire harness is manufactured based on the final harness design.

7. The system of claim 6, wherein the computing system, in response to execution of the computer-executable instructions, is further configured to:

compare the objects in the baseline harness design to corresponding objects in the second revised version of the baseline harness design and to corresponding objects in the first revised version of the baseline harness design; and modify one or more objects in the second revised version of the baseline harness design to match the corresponding objects in the first revised version of the baseline harness design when the one or more objects, characteristics, or relationships in the second revised version of the baseline harness design are the same as the corresponding objects, characteristics, or relationships in the baseline harness design and different than the corresponding objects, characteristics, or relationships in the first revised version of the baseline harness design.

8. The system of claim 7, wherein the computing system, in response to execution of the computer-executable instructions, is further configured to compare a topology in the baseline harness design to corresponding topology in the second revised version of the baseline harness design and to corresponding topology in the first revised version of the baseline harness design; and modify at least a portion of the topology in the second revised version of the baseline harness design to match the corresponding topology in the first revised version of the baseline harness design when the at least the portion of the topology in the second revised version of the baseline harness design is the same as the corresponding topology in the baseline harness design and different than the corresponding topology in the first revised version of the baseline harness design.

9. The system of claim 6, wherein the computing system, in response to execution of the computer-executable instructions, is further configured to modify the baseline harness design to generate the first revised version of the baseline harness design.

10. An apparatus comprising at least one non-transitory computer-readable memory device storing instructions configured to cause one or more processing devices to perform operations comprising:

comparing a baseline harness design describing a wire harness to a first revised version of the baseline harness design, which identifies alterations made to one or more object characteristics in the baseline harness design, wherein the object characteristics describe relationships between objects in the baseline harness design;

comparing the baseline harness design to a second revised version of the baseline harness design, which identifies one or more differences between the object characteristics in the second revised version of the baseline harness design and the object characteristics in the baseline harness design;

merging the first revised version of the baseline harness design with the second revised version of the baseline harness design to generate a final harness design by modifying one or more of the relationships described by the object characteristics in the second revised version of the baseline harness design to include one or more of the alterations to the object characteristics in made to the baseline harness design in the first revised version of the baseline harness design based on the differences between the object characteristics in the second revised version of the baseline harness design and the object characteristics in the baseline harness design; and recording the final harness design, which corresponds to the modification to the second revised version of the baseline harness design having one or more of the alterations made to the baseline harness design in the first revised version of the baseline harness design, wherein the wire harness is manufactured based on the final harness design.

11. The apparatus of claim 10, wherein modifying the relationships described by the object characteristics in the second revised version of the baseline harness design further comprises:

comparing the objects in the baseline harness design to corresponding objects in the second revised version of the baseline harness design and to corresponding objects in the first revised version of the baseline harness design; and modifying one or more objects in the second revised version of the baseline harness design to match the corresponding objects in the first revised version of the baseline harness design when the one or more objects, characteristics, or relationships in the second revised version of the baseline harness design are the same as the corresponding objects, characteristics, or relationships in the baseline harness design and different than the corresponding objects, characteristics, or relationships in the first revised version of the baseline harness design.

12. The apparatus of claim 11, wherein comparing the objects in the baseline harness design, the second revised version of the baseline harness design, and the first revised version of the baseline harness design further comprises comparing at least one of attributes of the objects or relationships to other objects.

13. The apparatus of claim 10, wherein the instructions are configured to cause one or more processing devices to perform operations further comprising:

comparing a topology in the baseline harness design to corresponding topology in the second revised version of the baseline harness design and to corresponding topology in the first revised version of the baseline harness design; and modifying at least a portion of the topology in the second revised version of the baseline harness design to match the corresponding topology in the first revised version of the baseline harness design when the at least the portion of the topology in the second revised version of the baseline harness design is the same as the corresponding topology in the baseline harness design and different than the corresponding topology in the first revised version of the baseline harness design.

14. The apparatus of claim 10, wherein the instructions are configured to cause one or more processing devices to perform operations further comprising modifying the baseline harness design to generate the first revised version of the baseline harness design.

\* \* \* \* \*